UNITED STATES PATENT OFFICE.

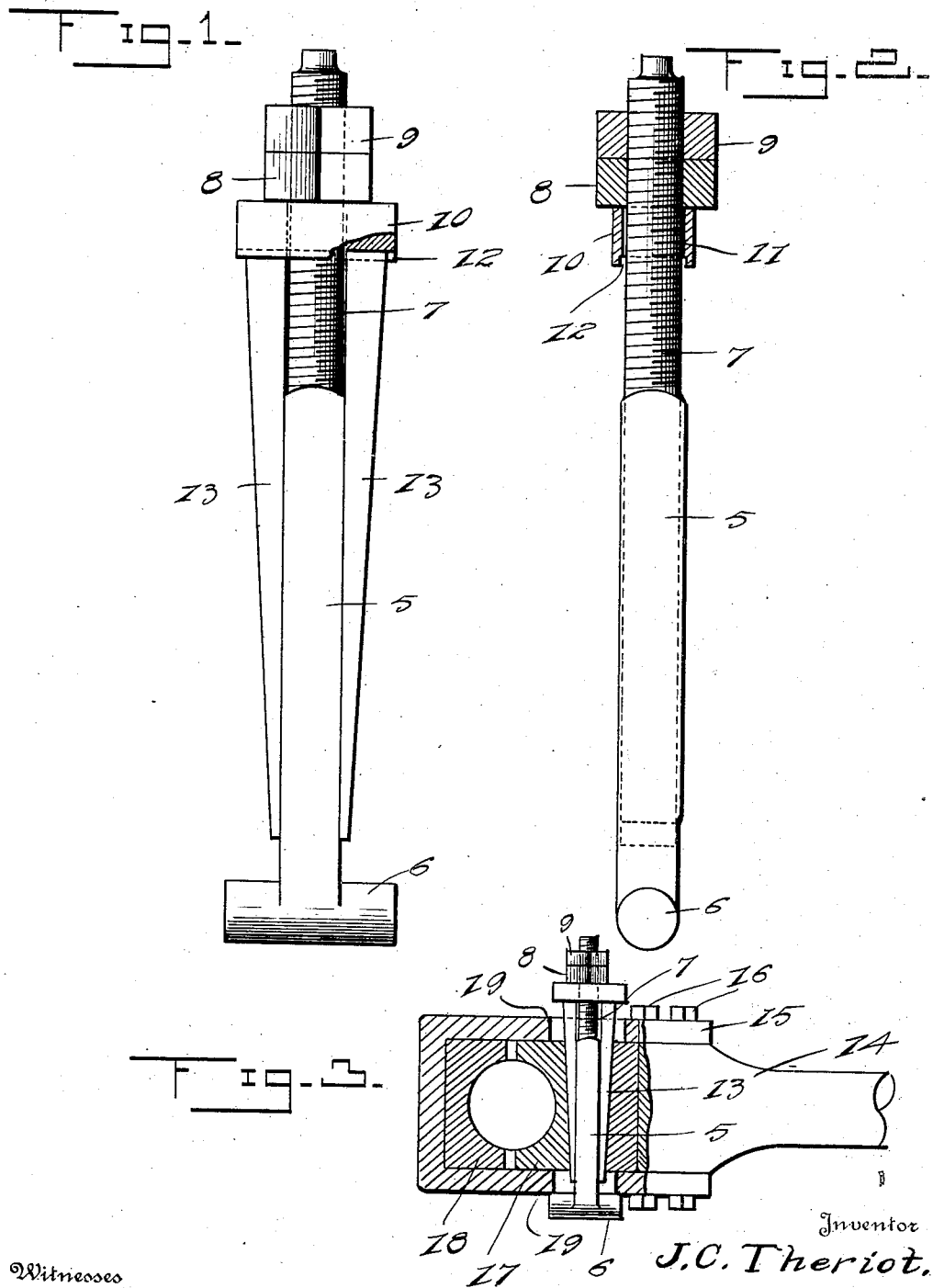

JAMES C. THERIOT, OF TAFT, CALIFORNIA.

GIB AND KEY FOR JOURNAL-BOXES.

1,240,512.

Specification of Letters Patent.

Patented Sept. 18, 1917.

Application filed March 3, 1916. Serial No. 81,952.

*To all whom it may concern:*

Be it known that I, JAMES C. THERIOT, a citizen of the United States, residing at Taft, in the county of Kern and State of California, have invented certain new and useful Improvements in Gibs and Keys for Journal-Boxes; and I do hereby declare the following to be a full, clear, and exact description of the invention, such as will enable others skilled in the art to which it appertains to make and use the same.

This invention relates to improvements in adjustable journal boxes, and more particularly to boxes of the connecting rods of engines.

The invention has for its primary object to provide simple and efficient means for effecting an accurate adjustment of the relatively movable bearing piece, which may be rigidly locked in adjusted position.

With this and other objects in view, the invention consists in the novel construction, combination and arrangement of parts as will be hereinafter specifically described, claimed and illustrated in the accompanying drawing, in which:

Figure 1 represents a front elevation of the adjusting means, partly in section, removed from the bearing box, Fig. 2 represents a side elevation thereof, partly in section, and Fig. 3 represents a fragmental side elevation of a connecting rod and journal box, the latter being partially in section, so as to clearly illustrate the adjusting means.

Referring to the drawing in detail, wherein similar reference numerals designate corresponding parts throughout the several views, the numeral 5 indicates a shank, preferably rectangular in cross section and having a cylindrical head 6 at one end thereof. The opposite end portion of the shank 5 is rounded and externally screw threaded, as indicated at 7, to receive the adjusting and lock nuts 8 and 9, respectively.

An adjusting block 10 having a central transverse opening 11 therethrough is slidably mounted upon the rounded extremity 7 of the shank 5 and is formed in its inner surface with a longitudinal groove 12, to receive the relatively large ends of a pair of wedges or tapered keys 13, which latter are slidably engaged with two of the opposed flat faces of the rectangular portion of the shank 5, and are adapted to be moved longitudinally of the latter toward the head 6 when the adjusting nut 8 is advanced upon the screw threads 7 of the shank. The adjusting device above described is particularly designed for use in connection with a connecting rod journal box of the type illustrated in Fig. 3 and including the connecting rod 14, U-shaped strap 15 connected with the head of the connecting rod 14 by bolts, or equivalent means, 16 and the inner and outer bearing pieces 17 and 18, respectively. The shank 5 is inserted upwardly through the apertures 19 formed in the parallel portions of the U-shaped strap 15 between the outer end of the connecting rod 14 and the inner adjustable bearing piece 17, the head 6 of the shank engaging the under surface of the strap 15. The upper threaded extremity 7 of the shank projects above the strap 15 and the wedges or tapered keys 13 are inserted between two of the opposed flat faces of the shank 5 and the adjacent surfaces of the connecting rod 14 and the adjustable bearing piece 17. The block 10 is subsequently slipped over the threaded extremity 7 of the shank and the relatively large ends of the wedges 13 are engaged in the groove 12. The desired adjustment of the movable bearing piece 17 is accomplished by fitting and advancing the adjusting nut 8 upon the screw threads 7 and subsequently locking the nut and co-acting parts in adjusted position by advancing the lock nut 9 against the adjusting nut 8.

What I claim is:

1. In a journal box, a shank substantially rectangular in cross section, a cylindrical head rigidly secured at one end of said shank, a pair of wedges engaged with two of the opposed faces of said shank, a block slidably mounted on said shank and engaging the enlarged ends of said wedges, and means for adjusting said block and wedges longitudinally of said shank, said block having means for preventing any relative lateral movement of said wedges.

2. In a journal box, a shank substantially rectangular in cross section, a cylindrical head formed integral with one end of said shank and extending outwardly from each side thereof for equal distances, a pair of wedges engaged with two of the opposed faces of said shank, the enlarged ends of said wedges being positioned opposite said head, a block slidably mounted on said shank, said block having a longitudinal groove on its inner face, the relatively large ends of said wedges being snugly received in said groove, whereby relative lateral movement of said wedges is prevented, and means engaging the outer faces of said block for adjusting the block and wedges longitudinally of said shank.

In testimony whereof I affix my signature in presence of two witnesses.

JAMES C. THERIOT.

Witnesses:
E. W. CRAGHILL,
WILLIAM JAN.